Nov. 30, 1926.
U. S. BOYLE ET AL
1,608,718
DELIVERING MACHINE
Filed Feb. 20, 1926  3 Sheets-Sheet 1
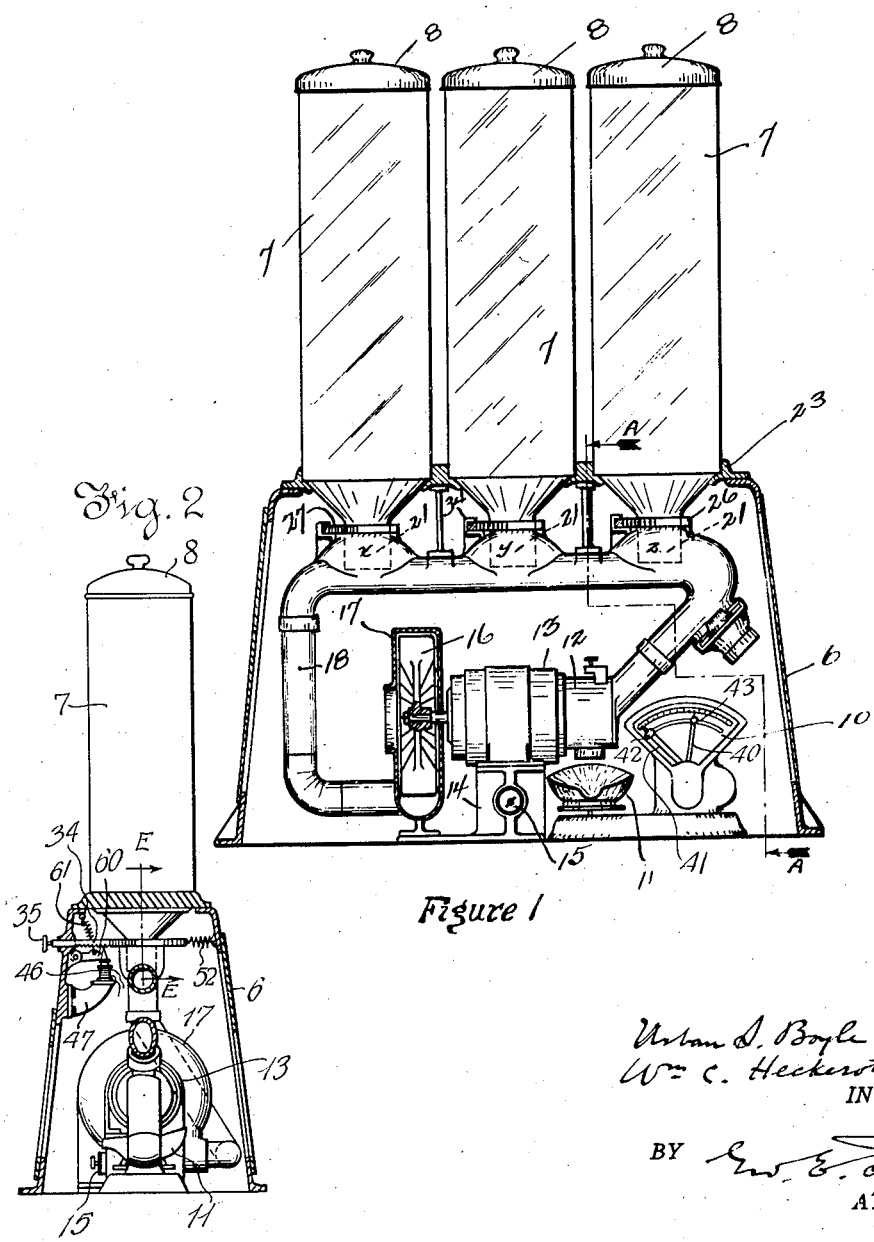

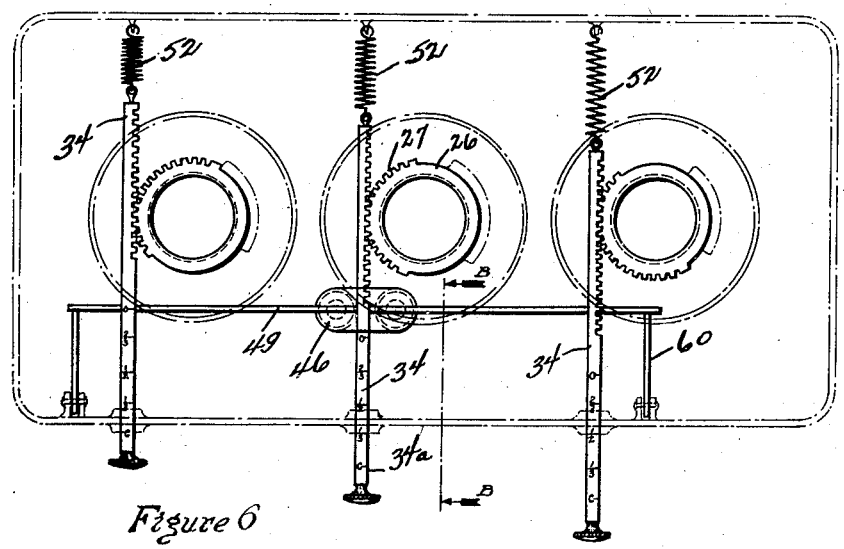
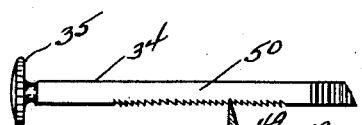
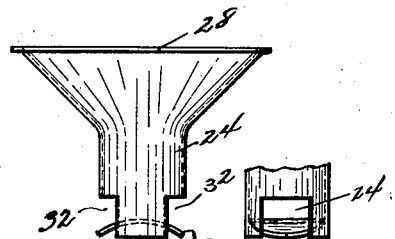
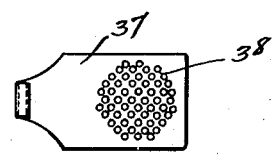
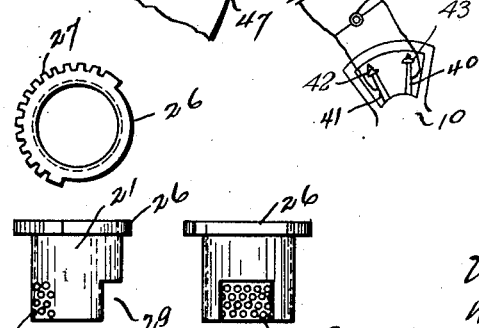
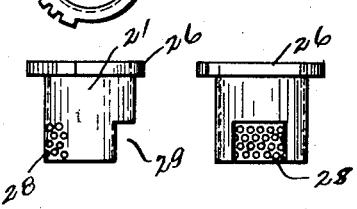

Nov. 30, 1926.

U. S. BOYLE ET AL

DELIVERING MACHINE

Filed Feb. 20, 1926  3 Sheets-Sheet 3

1,608,718

Urban O. Boyle
W⁼ C. Heckeroth
INVENTORS

BY
ATTORNEY

Patented Nov. 30, 1926.

1,608,718

UNITED STATES PATENT OFFICE.

URBAN S. BOYLE AND WILLIAM C. HECKEROTH, OF ERIE, PENNSYLVANIA.

DELIVERING MACHINE.

Application filed February 20, 1926. Serial No. 89,816.

This invention relates to delivery apparatus, and particularly to an apparatus adapted for use in stores, altho it is capable of other uses to which it may be fitted.

In the embodiment illustrated hereinafter, the apparatus is particularly adapted for mixing coffee of various grades or kinds and delivering the same to a grinder, and from the grinder to a scale. Instead of mixture of coffee of different kinds, only one kind may be delivered if desired. The proportion of each kind in a mixture is capable of modification and control. Hence the invention may be utilized in a larger apparatus, with some modification, for blending of coffee as in coffee roasting plants; or for blending or mixing different materials in predetermined proportions.

The particular apparatus hereinafter described comprises an enclosed unit or unitary structure in which are assembled the containers, a pneumatic conveyor, a grinder and the scales, as well as a motor which serves to operate the grinder and also the fan of the pneumatic conveyor.

The scale controls an electric device which acts to release a cut-off valve when the desired amount of material is delivered to the scale. The operation is automatic in this respect.

The article as shown may be mounted on a counter in a store where the coffee or other material in the containers will be visible to the purchaser. The containers are substantially air tight and by reason of the automatic control there is no delivery beyond the amount required. The invention avoids the loss incident to transferring coffee or other materials from bins to scales by means of scoops and also effects a saving of time and labor, the operations of mixing, grinding, and weighing being performed in a continuous manner.

Figure 7:
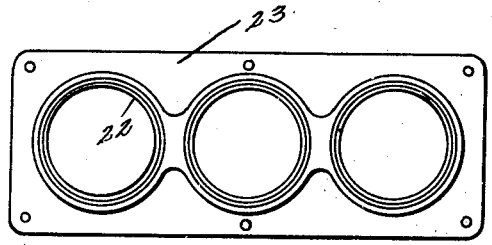
Figure 8:
Figure 9:
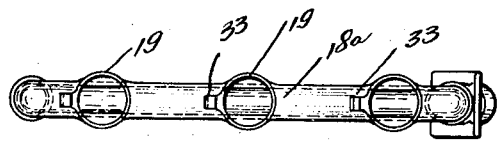
Figures 10, 11:
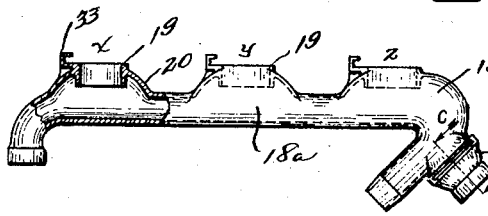
Figures 4, 5:
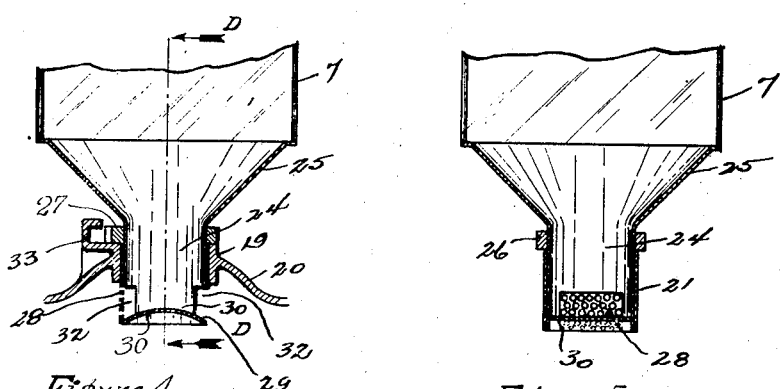

Other advantages will be apparent from the following description and the accompanying drawings, in which Fig. 1 is a front elevation of the machine with parts of the casing in section. Fig. 2 is a section on the line A—A of Fig. 1. Fig. 3 is an enlarged detail of the electric valve control. Fig. 4 is a section on the line E—E of Fig. 2. Fig. 5 is a section on the line D—D of Fig. 4. Fig. 6 is a top plan view of the valves. Figs. 7 and 8 are top and side views of the top plate of the casing. Figs. 9 and 10 are top and side views of a part of the conveyor pipe. Fig. 11 is a section on the line C—C of Fig. 10. Fig. 12 is a detail in side elevation of one of the hoppers leading to the conveyor pipe. Fig. 13 is a detail of a part of Fig. 12. Figs. 14, 15 and 16 are details in top and side views of one of the valves. Fig. 17 is a plan of an outlet valve for the escape of air from the air pipe or conveyor.

Referring specifically to the drawings, 6 indicates a base casing or housing of proper size and shape to enclose some of the parts as hereinafter described and to support a plurality of containers 7 adapted to hold the coffee or other material to be delivered. These containers are closed at the top by removable caps 8, thru which they may be filled from time to time. The front of the casing has an opening 9 to permit access to the scales 10 and permit removal of the scale pan 11 to which the material is delivered from a grinder 12 of any suitable kind. This grinder is driven by a motor 13 mounted on a support 14 in the housing. The motor is controlled by a switch indicated at 15. The motor also drives a rotary fan 16 the casing 17 of which discharges into a conveyor pipe 18 which extends upwardly and laterally and then downwardly to the grinder 12, for the pneumatic conveying of material delivered into the upper arm thereof from the containers.

This upper arm 18ª of the conveyor pipe is specially constructed, having a plurality of openings with collars 19 around the same at the top of the upwardly extending enlargements 20 in the top wall of the pipe. These collars receive the cut-off valves 21 which are capable of being turned therein. The valves are set in recesses 22 in a top plate 23 mounted on the housing and receiving the necks 24 of the hopper bottoms 25 of the containers, whereby the containers are supported in position to deliver from the hoppers to the valves. Each valve consists of a cylinder provided at the top with a rim 26 which rests on the top of collar 19, and this rim has a segmental pinion 27. The lower end of the valve has at one side a plurality of holes 28 and at the other side an outlet 29. The neck 24 of the hopper projects down into the valve and is provided with a convex bottom 30 and with openings 32 at opposite sides. The collar 19 has at one side a guide 33 for a rack rod 34 which engages the gear 27 and which extends thru an opening in the front plate of the housing and is provided with a handle 35 by which it may be manipulated. The conveyor tube 18ª, just beyond its elbow 18ᵇ is provided with an outlet 36 having a slide screen 37 with strainer holes 38 permitting the outlet of air and dust from the conveyor tube and allowing the coffee carried by the air to follow the pipe down to the grinder 12.

The grinder delivers to the pan 11 of the scales. The scales are provided with a pointer 40 which may be set to any desired amount, and with a movable pointer 41 which swings as the material is delivered into the sacle pan. These pointers have conductors 42 and 43 in the circuit indicated by the wires 44 and 45 with magnets 46 supported by a bracket 47 on the inside of the housing and having an armature 48 with a catch bar 49 engageable with teeth 50 on the under side of the valve rods 34. The catch bar 49 is carried by pivoted arms 60 and is normally lifted by a spring 61 to engagement with the rack bars. These rack bars are normally pulled back by the springs 52 connected between the rear ends thereof and the back wall of the housing, and each bar has a series of marks 34ª to indicate the extent to which the respective valves are opened.

The operation will now be understood: Assuming that five pounds of coffee or other material are desired, composed of two pounds of one kind, two pounds of another kind and one pound of the remaining kind, the respective rods 34 are pulled out to appropriate distances, that is, two rods to a certain distance and one rod to half the distance. This turns the respective valves accordingly, and registers the openings 28, 29 and 32 accordingly, and the coffee is thus free to flow out of each container in the same proportion. The motor is then started and the fan forces a blast of air thru the conveyor pipe which picks up the coffee and blows the same thru the pipe and into the grinder which is then running. The air blast with the entrained dust escapes thru outlet 36 which may be connected with any suitable waste. The ground coffee flows from the grinder into the scale pan, and when it reaches the desired weight the contacts 42 and 43 close and actuate the magnets 46 which pull down the armature 48 and release the catch bar 49. The springs 52 then act to retract the rods 34 and return the valves to closed position with the openings 32 out of register with the openings 28 and 29.

The enlargements 20 and openings 28 have been referred to. This construction has advantages. It will be found that by reason of the enlargements the air flows upwardly thru the openings 28 and has the effect of agitating the coffee or other material in the necks 24, thereby insuring a free flow of material and also tending to assist the delivery of material from the neck thru the outlet opening 29.

It may be added that when the scale pan 11 is removed to place the ground material into a bag for delivery, the pointer 41 returns to its original position. This opens the circuit of the magnets and allows the catch bar 49 to return to its original position to engage the bars 34 when they are reset.

It is obvious that by the means described mixtures of various kinds may be delivered from the containers, or if desired only one kind of material may be delivered, and the action continues until the desired quantity is weighed, at which time the flow will be stopped. If a refinement of weight is desired, incident to any small quantity which may remain in the conveyor pipe after the flow from the containers is stopped, it may be compensated by a predetermined proportion of one of the contact pieces, the contact piece 43, for example, being illustrated as somewhat larger on this account. Various modifications may be made within the scope of the invention. Thus the number of containers and consequently the number of kinds or grades of material to be delivered or mixed, may be varied as desired. The whole apparatus is practically self-contained and forms an ornamental piece of store furniture, eliminating the use of scoops or the transfer of materials by hand from bins to grinders or scales. The circuit of the magnets may also include a switch button indicated at 70, whereby the rods 34 may be released at any time, independent of the scales, thus permitting flow to be stopped at any time.

It may also be mentioned that unground coffee may be delivered if desired. In this event, the grinder can be set so as not to grind, in a manner well known in the art, and consequently the material delivered to the grinder will pass out without being ground, onto the scale pan.

We claim:

1. The combination of a supporting base, a container mounted thereon, a pneumatic conveyor pipe into which the container feeds, a grinder into which the outlet end of the conveyor pipe discharges, a fan connected to the opposite end of the pipe in advance of the container, whereby the fan blast picks up the material fed into the pipe from the container and carries it to the grinder, and means to control the flow from the container to the conveyor pipe.

2. In an apparatus for mixing and grinding materials, the combination of a base, a plurality of containers mounted on the base, a fan, a grinder, a pneumatic conveyor connecting the fan and grinder and into which the containers respectively discharge between the fan and the grinder, and means to separately control the flow from each container to the conveyor.

3. The combination stated in claim 2, and a scale to which the grinder delivers, said means being automatically controlled by the scale to cut off the flow when a predetermined weight is reached.

4. The combination of a hollow base, containers mounted on the top thereof, a fan in the base, a grinder in the base, means to drive the fan and the grinder, a conveyor pipe extending from the fan to the grinder and adapted to receive material from the said containers between the fan and the grinder, and means to control the flow from each container to the conveyor pipe.

5. The combination stated in claim 4, said means including electrically controlled valve operating devices actuated by the amount of material delivered from the grinder.

6. The combination of a hollow base, a plurality of containers mounted thereon and having hopper bottoms with downwardly projecting necks, a fan in the base, a grinder in the base, means to drive the fan and the grinder, a conveyor pipe connecting the fan and the grinder and having openings between the fan and the grinder thru which said necks project into the conveyor pipe, and a valve controlling the discharge from each neck into the pipe.

7. The combination stated in claim 6, each of said valves having an opening to admit air from the pipe into the neck and an opening to permit flow of material from the neck into the pipe.

8. The combination stated in claim 1, said container comprising a pipe provided with a screen outlet for the escape of air between the container and the grinder.

9. The combination of a hollow base, a plurality of containers mounted thereon, a motor in the base, a fan in the base, driven by said motor, a grinder in the base, driven by said motor, a conveyor pipe enclosed within the base and connecting the fan and the grinder, said containers opening into said pipe between the fan and the grinder, and valves between the respective containers and the conveyor pipe controlling the flow thru said openings to the pipe.

In testimony whereof, we affix our signatures.

URBAN S. BOYLE.
WILLIAM C. HECKEROTH.